(12) United States Patent
Kondo et al.

(10) Patent No.: US 11,919,572 B2
(45) Date of Patent: Mar. 5, 2024

(54) VEHICLE BODY STRUCTURE

(71) Applicant: HONDA MOTOR CO., LTD., Tokyo (JP)

(72) Inventors: Takehiro Kondo, Tokyo (JP); Kodai Omine, Tokyo (JP); Ryoji Inaba, Tokyo (JP); Kazuki Takagi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 135 days.

(21) Appl. No.: 17/544,440

(22) Filed: Dec. 7, 2021

(65) Prior Publication Data

US 2022/0177044 A1 Jun. 9, 2022

(30) Foreign Application Priority Data

Dec. 9, 2020 (JP) ................. 2020-203887

(51) Int. Cl.
*B62D 25/20* (2006.01)
*B62D 25/08* (2006.01)
*B62D 21/09* (2006.01)
*B62D 21/11* (2006.01)
*B62D 21/15* (2006.01)

(52) U.S. Cl.
CPC ......... *B62D 25/2027* (2013.01); *B62D 25/08* (2013.01); *B62D 21/09* (2013.01); *B62D 21/11* (2013.01); *B62D 21/15* (2013.01); *B62D 21/155* (2013.01)

(58) Field of Classification Search
CPC .. B62D 25/2027; B62D 25/08; B62D 21/155; B62D 21/11; B62D 21/09; B62D 21/15

USPC ..................................... 296/203.04
See application file for complete search history.

(56) References Cited

U.S. PATENT DOCUMENTS 7,213,873 B2 * 5/2007 Murata ................. B62D 21/11
296/204
9,150,253 B2 * 10/2015 Watanabe .............. B62D 21/11

FOREIGN PATENT DOCUMENTS

JP 2001-048050 A 2/2001

* cited by examiner

*Primary Examiner* — Amy R Weisberg
*Assistant Examiner* — Dana D Ivey
(74) *Attorney, Agent, or Firm* — Rankin, Hill & Clark LLP (57) ABSTRACT

A vehicle body structure includes: a subframe arranged in front of an occupant compartment; a subframe rear base arranged in a width direction of a vehicle on a lower surface of the occupant compartment; a floor frame arranged in a longitudinal direction of the vehicle on the lower surface of the occupant compartment; a subframe mount part placed at a portion where the subframe rear base overlaps with the floor frame, to support the subframe; a mounting seat formed along a horizontal plane; a fastener to fix the subframe to the mounting seat; and a reinforcing member placed to overlap with the mounting seat. The reinforcing member includes a flange, which is continuous to surround a periphery of the fastener and is arranged in a vertical direction of the vehicle, at a portion thereof closer to the subframe, and outer in the width direction, than the fastener.

4 Claims, 5 Drawing Sheets

VEHICLE BODY STRUCTURE

CROSS-REFERENCE TO RELATED APPLICATION

The present application claims the benefit of priority to Japanese Patent Application No. 2020-203887 filed on Dec. 9, 2020, the disclosures of all of which are hereby incorporated by reference in their entireties.

TECHNICAL FIELD

The present disclosure relates to a vehicle body structure which protects occupants in an occupant compartment when an excessive load is inputted from outside, while maintaining high rigidity.

BACKGROUND

Conventionally, a vehicle is provided at various parts of a vehicle body, for protecting occupants in an occupant compartment from an excessive input load due to collision or the like, with impact-absorbing structures to absorb an excessive input load, and frame structures to maintain an internal space of the occupant compartment without being deformed, even with impact, and the like.

For example, Japanese Patent Application Publication No. 2001-48050 (referred to as Patent Document 1 below) discloses a structure, in which subframes which support wheels via suspensions, while forming an engine compartment, are fastened with bolts to, and supported by, a body for an occupant compartment.

Therefore, peripheries around bolt fastening parts, at which the subframes are fastened to and supported by the body for the occupant compartment, are configured to have high rigidity.

Further, the subframes are configured to come off subframe mount parts when an excessive load is inputted to the subframes from outside, so as to prevent the input load from being transmitted to the occupant compartment.

Therefore, rigidity of the bolt fastening parts in the body for the occupant compartment is set to be lower than that of the peripheries around the bolt fastening parts, in order to reliably cause the subframes to come off with the excessive input load.

In the structure of Patent Document 1, in order to increase the rigidity of the peripheries of the bolt fastening parts, a reinforcing plate is fixed to a bottom surface of each subframe mount part, and a reinforcing member having a box shape is placed on the reinforcing plate to define a closed space around the bolt fastening part.

However, with the structure as described above, there arises problems such as an increase in vehicle weight and an increase in manufacturing costs.

In view of the problems above, the present disclosure is intended to provide a vehicle body structure which has high rigidity and causes a subframe to come off when an excessive load is inputted from outside, while suppressing an increase in vehicle weight and an increase in manufacturing costs.

SUMMARY OF THE DISCLOSURE

To achieve an object described above, a vehicle body of the present disclosure includes: a subframe arranged in front of or behind an occupant compartment; a subframe rear base arranged in a width direction of a vehicle on a lower surface of a part of the occupant compartment facing the subframe; a floor frame arranged in a longitudinal direction of the vehicle on a lower surface of the occupant compartment; a subframe mount part placed at a position where the subframe rear base overlaps with the floor frame, to support an end, closer to the occupant compartment, of the subframe; a mounting seat formed along a horizontal plane, to form the subframe mount part; a fastener to fix the subframe to the mounting seat; and a reinforcing member which is a plate-shaped member and is placed to overlap with the mounting seat, wherein the reinforcing member includes a flange, which is continuous to surround a periphery of the fastener and is arranged in a vertical direction of the vehicle, at a portion thereof closer to the subframe, and outer in the width direction, than the fastener.

According to the present disclosure, a vehicle body structure is provided to have high rigidity and to cause a subframe to come off when an excessive load is inputted from outside, while suppressing an increase in vehicle weight and an increase in manufacturing costs.

EMBODIMENTS OF THE DISCLOSURE

First Embodiment

A description is given in detail of a vehicle body structure S1 according to an embodiment of the present disclosure with reference to FIGS. 1 to 6.

In the description, note that the same components are denoted by the same reference signs, and duplicate descriptions thereof are omitted.

Further, in the following description, a "front", a "rear", an "up", a "down", an "inside", and an "outside" refer to a "front" and a "rear" in a longitudinal direction of a vehicle, an "up" and a "down" in a vertical direction of the vehicle, and an "inside" and an "outside" in a width direction of the vehicle, unless otherwise specified.

Figure 1:
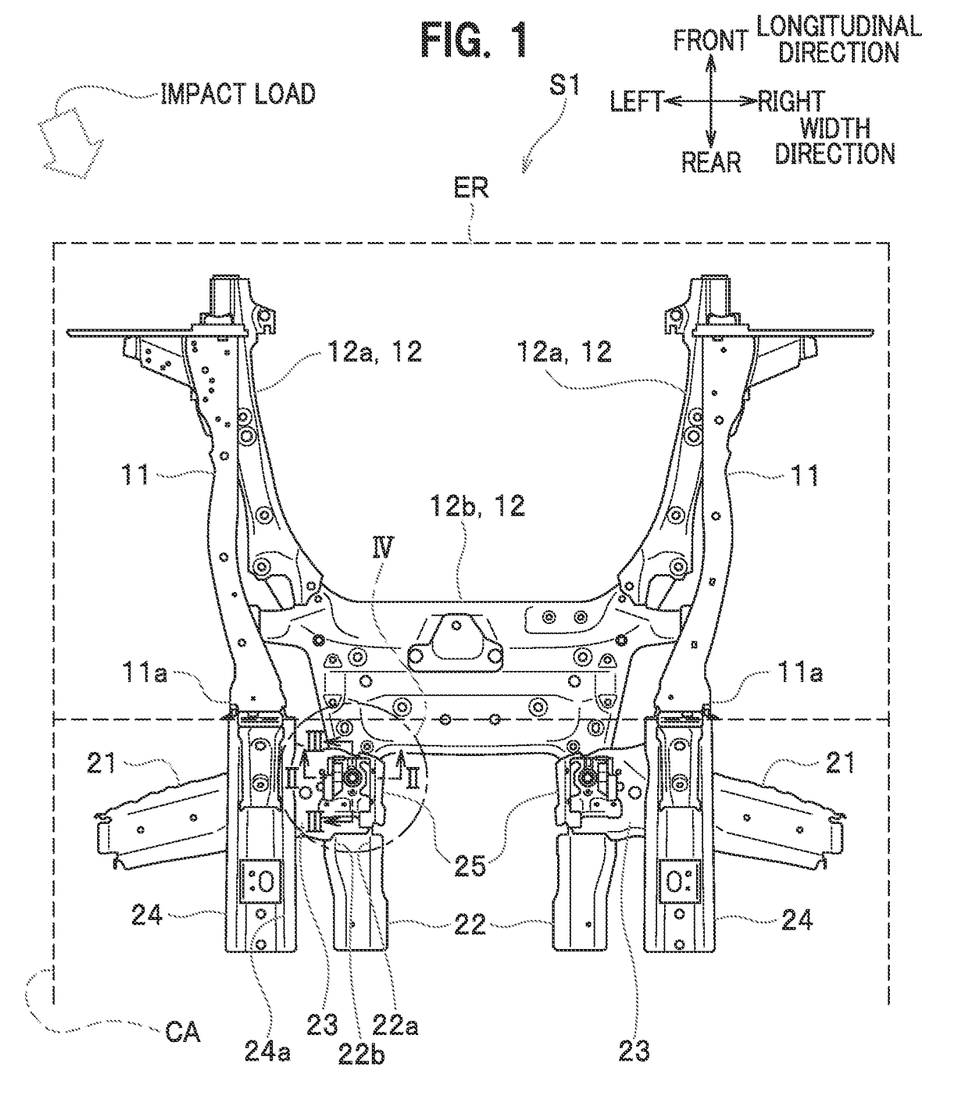
FIG. 1 is a plan view of a vehicle body structure according to a first embodiment.

As illustrated in FIG. 1, the vehicle body structure S1 of the present embodiment is a structure to protect occupants in an occupant compartment when a vehicle body collides, mainly from up ahead or obliquely up ahead of the vehicle body.

The vehicle body structure S1 of the present embodiment is provided at a coupling part between an occupant compartment CA and an engine compartment ER located in front of the occupant compartment CA (see FIG. 1).

The vehicle body structure S1 of the present embodiment includes, as frame members of the vehicle body, front side frames 11, front-side rear ends 11a, outriggers 21, floor frames 22, subframe rear bases 23, and a subframe 12.

The front side frames 11 are arranged in a pair on right and left sides along the longitudinal direction in the engine compartment ER.

The front side frames 11 are formed, at rear ends thereof, with the front-side rear ends 11a and are arranged in front of the occupant compartment CA via the front-side rear ends 11a.

The front-side rear ends 11a extend rearward in the vehicle body along a lower surface of a lower dash panel (not shown) forming an outer shell of the occupant compartment CA and a lower surface of a floor panel (not shown), to be continuous to front ends of floor side frames 24.

Further, each front-side rear end 11a has a U-shape in cross section which is open upward, and is joined to the lower surfaces of the lower dash panel and the floor panel to form a continuous closed cross-section in the longitudinal direction.

Still further, the outriggers 21 are coupled to the front-side rear ends 11a.

The outriggers 21 are arranged on a front lower surface of the occupant compartment CA, along the width direction.

The outriggers 21 are coupled, at inner ends thereof, to the front-side rear ends 11a, and are coupled, at outer ends thereof, to side sills (not shown) as frame members forming side parts for the occupant compartment CA.

Further, each outrigger 21 has a U-shape in cross section, is arranged to be open upward, and is joined to the lower surface of the floor panel and the lower surface of the lower dash panel.

Thus, the outrigger 21, together with the floor panel and the lower dash panel, forms a continuous closed cross-section in the width direction.

The floor frames 22 are arranged in a pair on both sides in the longitudinal direction of a floor tunnel (not shown) extending longitudinally in the center in the width direction of a floor for the occupant compartment CA.

Each floor frame 22 has a U-shape in cross section, is arranged to be open upward, and is joined to the lower surface of the floor panel and the lower surface of the dash lower panel.

Thus, the floor frame 22, together with the floor panel and the lower dash panel, forms a continuous closed cross-section in the width direction.

The subframe rear bases 23 are arranged on the front lower surface for the occupant compartment CA, in a pair on the right and left sides in the width direction (see FIG. 1).

The subframe rear bases 23 are coupled, at inner ends thereof, to front ends of the floor frames 22, and are coupled, at outer ends thereof, to the coupling parts between the outriggers 21 and the front-side rear ends 11a.

Further, each subframe rear base 23 has a U-shape in cross section, is arranged to be open upward, and is joined to the lower surface of the floor panel and the lower surface of the lower dash panel.

Thus, the pair of right and left subframe rear bases 23 form, together with the floor panel and the lower dash panel, closed cross-sections in the width direction, respectively.

Further, the subframe rear bases 23 are provided, at portions thereof overlapping with the floor frames 22, with subframe mount parts 25 as portions to cause the subframe 12 to be supported by the vehicle body.

The subframe 12 is arranged below the front side frames 11 located in the engine compartment ER to support drive system components and suspension components (not shown) (see FIG. 1).

The subframe 12 includes subframe arms 12a, a subframe body 12b, and subframe fastening parts 12c.

The subframe arms 12a are formed of a pair of members and are arranged below the front side frames 11 on the right and left sides.

Each subframe arm 12a is a member extending in the longitudinal direction, and a rear end thereof is supported by the subframe body 12b in a cantilever manner.

The subframe body 12b is arranged in front of the lower dash panel along the width direction, to be coupled to rear ends of the subframe arms 12a.

Thus, the subframe 12 has a U-shape in a plan view formed by the subframe body 12b and the pair of subframe arms 12a.

The subframe fastening parts 12c are arranged in a pair on the right and left sides at rear portions of the respective subframe arms 12a at a rear edge of the subframe body 12b.

Each subframe fastening part 12c has a cylindrical hole which vertically penetrates the subframe body 12b and through which a shaft of a fastening bolt 32 is inserted.

The subframe fastening parts 12c on the right and left sides are fastened to the subframe mount parts 25 with fasteners 30, to arrange the subframe 12 in front of the occupant compartment.

Figure 2:
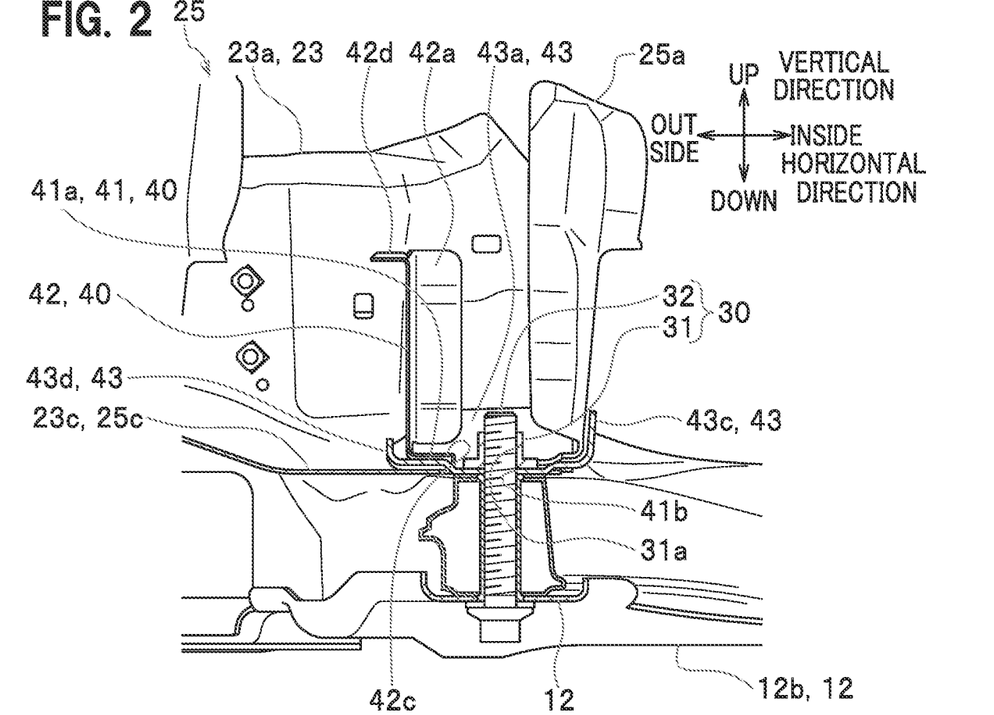
FIG. 2 is a cross-sectional view taken along a line II-II in FIG. 1.
Figure 3:
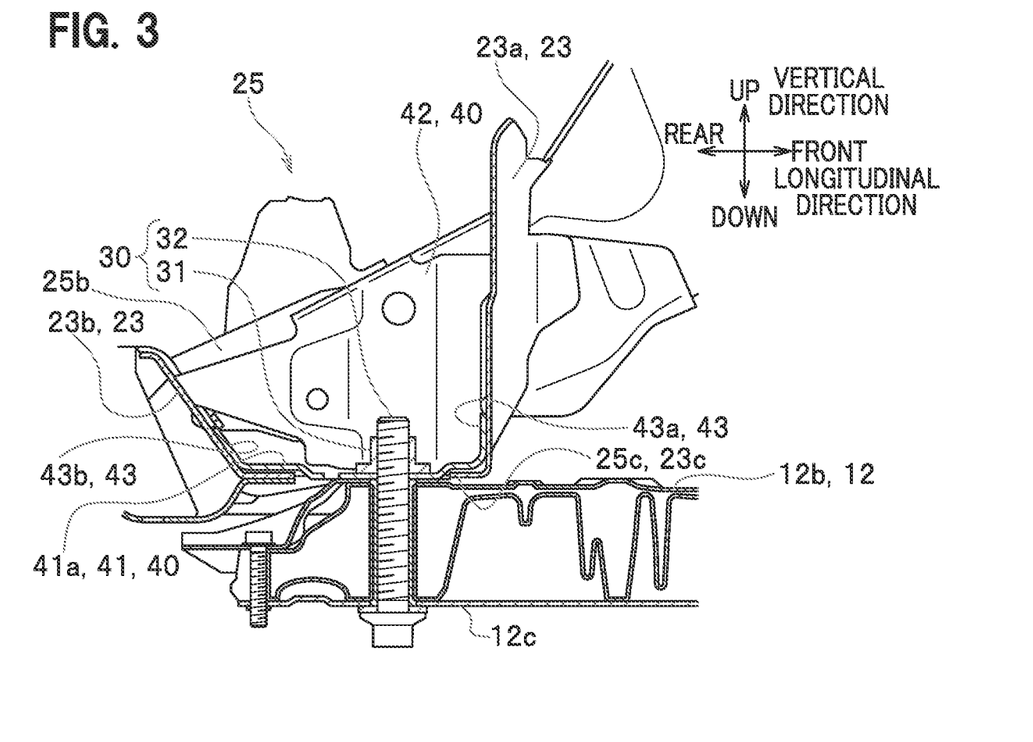
FIG. 3 is a cross-sectional view taken along a line in FIG. 1.

The subframe mount parts 25 are arranged at portions thereof where inner ends in the width direction of the subframe rear bases 23 and front ends of the floor frames 22 overlap with each other, each having a box shape which is open upward (see FIGS. 1 to 3).

That is, the box shape of the subframe mount part 25 is formed by a front wall 23a, a rear wall 23b, an inner wall 25a, an outer wall 25b, and a bottom part 23c.

The front wall 23a, the rear wall 23b, and the bottom part 23c form a U-shape in cross section of the subframe rear base 23.

That is, the front wall 23a is a front wall forming the U-shape in cross section of the subframe rear base 23.

The rear wall 23b is a rear wall forming the U-shape in cross section of the subframe rear base 23.

The bottom part 23c is a bottom part forming the U-shape in cross section of the subframe rear base 23.

Figure 4:
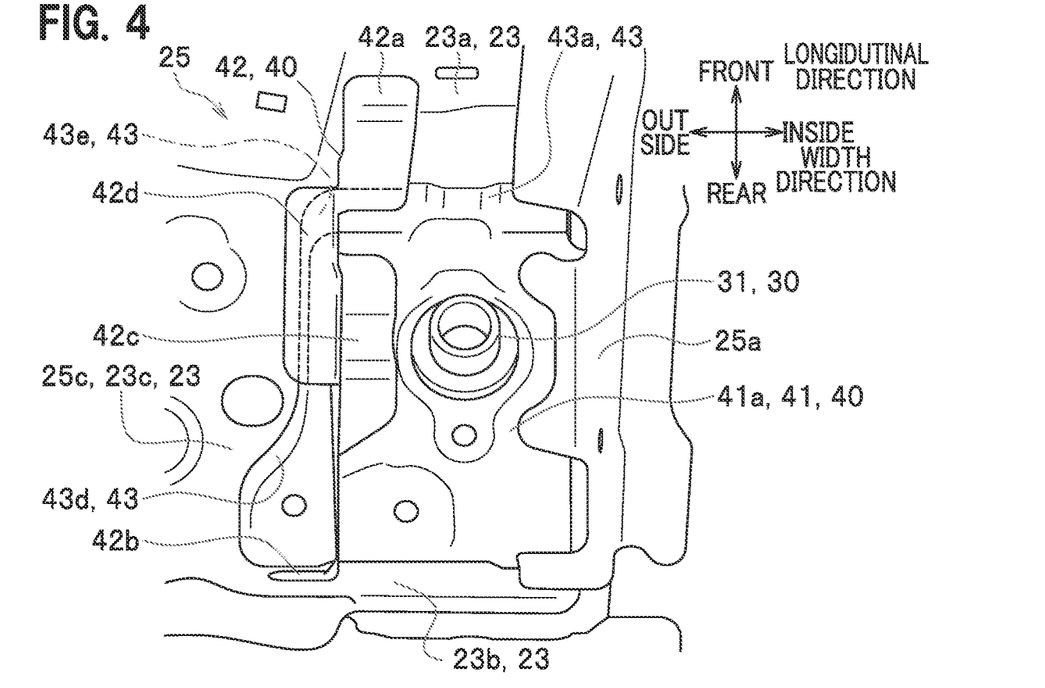
FIG. 4 is an enlarged perspective view of main parts included in a portion IV in FIG. 1.
Figure 5:
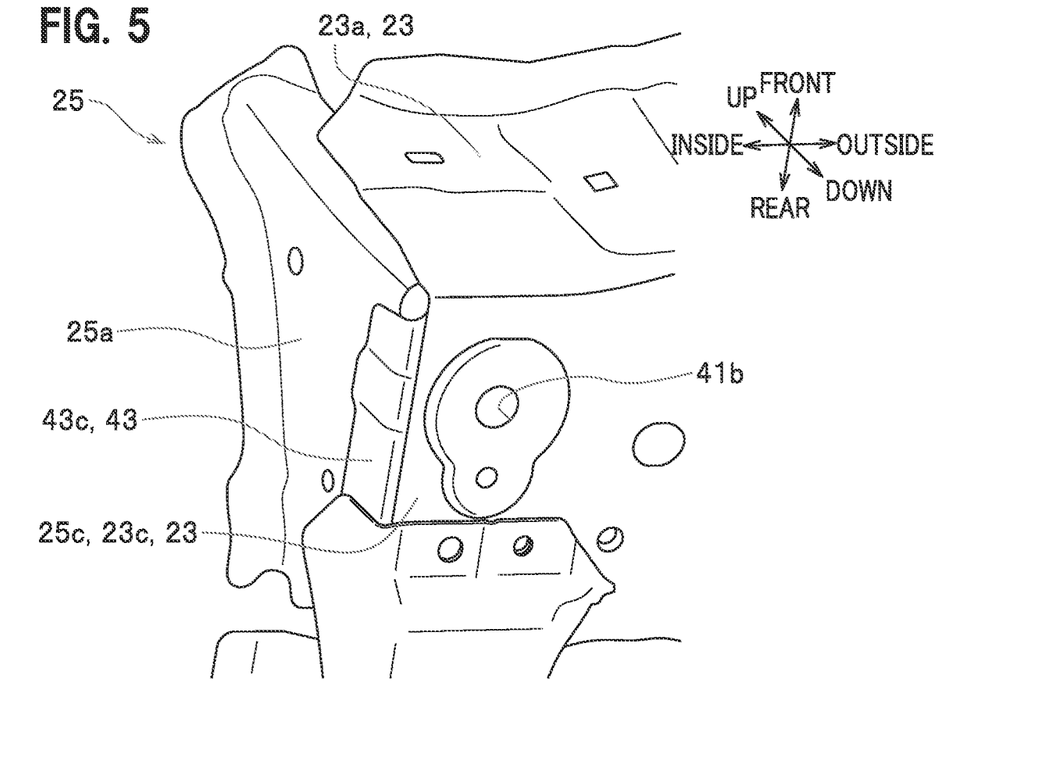
FIG. 5 is an enlarged perspective view of the main parts in the portion IV in FIG. 1, as viewed from a bottom thereof.

Further, the bottom part 23c is set to be a mounting seat 25c (see FIGS. 4 and 5).

The mounting seat 25c is formed along a horizontal plane, and a reinforcing member 41 is arranged on an upper surface of the mounting seat 25c to overlap with each other.

Further, a bulkhead 42 is arranged between the front wall 23a and the rear wall 23b.

The inner wall 25a is formed of a plate member forming a U-shape in cross section at an inner end of the subframe rear base 23.

Further, the inner wall 25a is arranged on an extension line of an inner wall 22a forming a U-shape in cross section of the floor frame 22.

The outer wall 25b is formed of a wall 24a on an inner side forming a U-shape in cross section of the floor side frame 24.

The reinforcing member 41 includes a reinforcing base 41a and a weld nut 31.

The reinforcing base 41a is formed of a rectangular plate member, having a periphery thereof in contact with a boundary between the mounting seat 25c and the front wall 23a, a boundary between the mounting seat 25*c* and the rear wall 23*b*, and a boundary between the mounting seat 25*c* and the inner wall 25*a*.

Further, a flange 43 is arranged to extend upward around the periphery of the reinforcing base 41*a*.

Still further, the reinforcing base 41*a* has a through hole 41*b*, which is open in the vertical direction, in the center thereof. The weld nut 31 is arranged on an upper surface of the reinforcing base 41*a*, so as to have a thread hole 31*a* of the weld nut 31 coinciding with the through hole 41*b*.

The weld nut 31 forms the fastener 30, together with the fastening bolt 32.

As illustrated in FIGS. 2 and 3, the flange 43 includes a front flange 43*a*, a rear flange 43*b*, an inner flange 43*c*, and an outer flange 43*d*.

As illustrated in FIG. 3, the front flange 43*a* extends upward at a front edge of the reinforcing base 41*a*, following an inner peripheral surface of the front wall 23*a*, and is jointed to the front wall 23*a*.

Further, the front flange 43*a* extends in the width direction such that an inner end thereof is located more on an inner side than the weld nut 31.

The rear flange 43*b* extends upward at a rear edge of the reinforcing base 41*a*, following an inner peripheral surface of the rear wall 23*b*, and is joined to the rear wall 23*b*.

As illustrated in FIG. 2, the inner flange 43*c* extends upward at an inner edge of the reinforcing base 41*a*, following an outer peripheral surface of the inner wall 25*a*, and is joined to the inner wall 25*a* (see FIG. 5).

The outer flange 43*d* extends upward at an outer edge of the reinforcing base 41*a*, along the longitudinal direction.

The outer flange 43*d* extends in the longitudinal direction such that a rear end thereof is located closer to an occupant compartment than the weld nut 31.

Further, the outer flange 43*d* extends upward such that a front end thereof is continuous to an outer end of the front flange 43*a* via a corner 43*e*.

The corner 43*e* extends upward from an outer front of the reinforcing base 41*a*, while being bent in an arc shape in a plan view.

In addition, the outer flange 43*d* extends upward such that the rear end thereof is continuous to an outer end of the rear flange 43*b*.

That is, the front flange 43*a*, the outer flange 43*d*, and the rear flange 43*b* continuously extend upward to surround a periphery of the weld nut 31 (the fastener 30).

As illustrated in FIGS. 2 to 4, the bulkhead 42 is formed of a plate-shaped member and is arranged on the reinforcing base 41*a* along the longitudinal direction between the outer flange 43*d* and the weld nut 31 in a state that plate surfaces thereof face in the width direction. Further, the bulkhead 42 is arranged on an extension line of an outer wall 22*b* forming a U-shape in cross section of the floor frame 22.

The bulkhead 42 includes a front junction 42*a*, a rear junction 42*b*, a lower junction 42*c*, and an upper junction 42*d*.

The front junction 42*a* is formed by a front edge of the bulkhead 42 bent inward in the width direction and is joined to the front wall 23*a*.

The rear junction 42*b* is formed by a rear edge of the bulkhead 42 bent outward in the width direction and is joined to the rear wall 23*b*.

The lower junction 42*c* is formed by a lower edge of the bulkhead 42 bent inward in the width direction and is joined to the reinforcing base 41*a*.

Next, a description is given of procedures for fastening the subframe 12 to the subframe mount parts 25.

First, the rear end of the subframe 12 is placed on the subframe mount parts 25 from below, to cause the cylindrical holes of the subframe fastening parts 12*c* to communicate with the thread holes 31*a* of the weld nuts 31.

Next, the fastening bolts 32 are inserted though the subframe fastening parts 12*c* from below and are screwed in the weld nuts 31 with a predetermined fastening torque, to fasten the subframe 12 to the subframe mount parts 25.

With the vehicle body structure S1 as described above, rigidity of the subframe mount parts 25 is increased, without inhibiting breakage of the weld nuts 31.

Note that the subframe 12 supports wheels (not shown) via suspension components (not shown), so that vibration and noise from the wheels are transmitted to the occupant compartment CA when a vehicle is traveling.

As a method for reducing vibration and noise transmitted to the occupant compartment CA, increasing rigidity of the subframe mount parts 25 is considered.

The subframe mount parts 25 form the frame of the vehicle body and are required to have high rigidity so that the method for increasing rigidity of the subframe mount parts 25 is appropriate.

Figure 6:
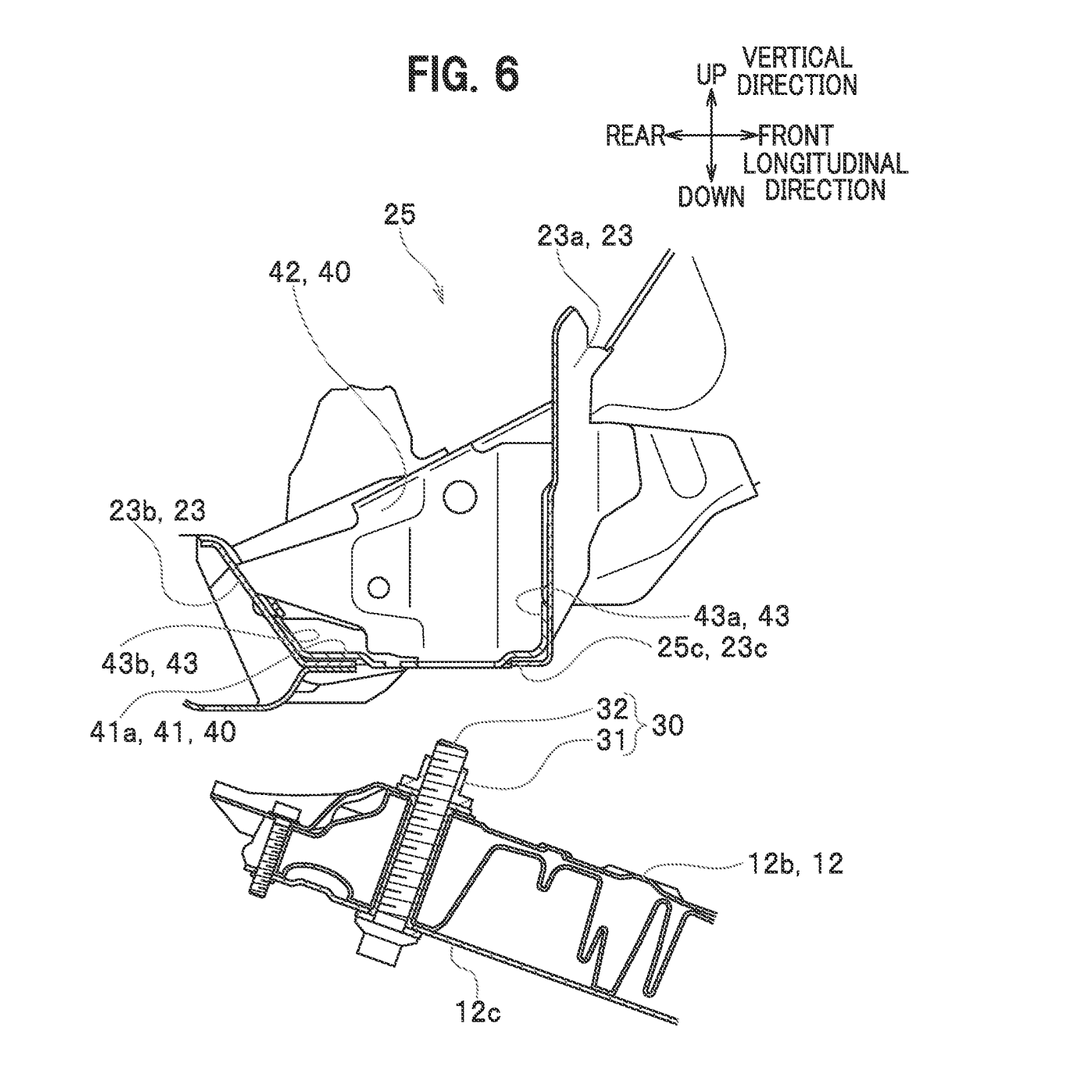
FIG. 6 is a cross-sectional view of the vehicle body structure having a subframe come off after an excessive load has been inputted from outside in a state illustrated in FIG. 3.

Further, with the vehicle body structure S1 as described above, when an impact load is inputted from up ahead or obliquely up ahead of the vehicle, the reinforcing bases 41*a* around the weld nuts 31 are broken, and the subframe 12 comes off, together with the weld nuts 31.

In contrast, with a structure where the reinforcing device 40 (reinforcing member 41, bulkhead 42) is not provided, the rigidity of the subframe mount parts 25 is insufficient, and the mounting seats 25*c* are liable to be deformed by the impact load.

When the mounting seats 25*c* are deformed, the load is dispersed around the weld nuts 31, not to cause the reinforcing bases 41*a* to be broken, and the subframe 12 may not come off at a predetermined timing.

Meanwhile, the vehicle body structure S1 of the present embodiment includes the reinforcing members 41 and the bulkheads 42, to give sufficient rigidity to the subframe mount parts 25.

For this reason, when an impact load in the longitudinal direction is inputted to the subframe rear bases 23, the bulkheads 42 and the inner walls 25*a* support the subframe rear bases 23 such that the U-shapes in cross section of the subframe rear bases 23 are not crushed, to transmit the load to the floor frames 22.

Further, the outer flanges 43*d* and the inner flanges 43*c* of the reinforcing members 41 suppress deformation of the mounting seats 25*c* against the impact load in the longitudinal direction.

Still further, the front walls 23*a* and the rear walls 23*b* of the subframe mount parts 25 and the front flanges 43*a* and the rear flanges 43*b* of the reinforcing members 41 suppress deformation of the mounting seats 25*c* against an impact load in the width direction.

In addition, the front flanges 43*a* are continuous to the outer flanges 43*d*, so that deformation of the mounting seats 25*c* is suppressed even against an impact load from obliquely up ahead.

The vehicle body structure S1 of the present embodiment includes the reinforcing members 41 as the reinforcing device 40 arranged to overlap with the mounting seats 25*c*, and the reinforcing members 41 have the front flanges 43*a* and the outer flanges 43*d* continuously extending upward via the corners 43*e*.

That is, the reinforcing members 41 include the flanges 43, which are continuous to surround the weld nuts 31 and extend upward, at portions of the reinforcing bases 41a, closer to the subframe rear bases 23 and located outer in the width direction than the weld nuts 31.

The reinforcing members 41 having a plate shape as described above increases rigidity of the mounting seats 25c, to suppress deformation of the mounting seats 25c.

Thus, the vehicle body structure S1 has high rigidity while suppressing an increase in vehicle weight and an increase in manufacturing costs, and causes the subframe 12 to come off when an excessive load is inputted.

The vehicle body structure S1 of the present embodiment has the outer flanges 43d extending in the longitudinal direction such that rear ends of the outer flanges 43d are located behind the weld nuts 31.

Accordingly, the vehicle body structure S1 has the mounting seats 25c made to have further increased rigidity, to suppress deformation and bending deformation of the mounting seats 25c, thereby causing the subframe 12 to come off more reliably when an excessive load is inputted.

Further, the vehicle body structure S1 of the present embodiment has the front flanges 43a extending in the width direction such that inner ends of the front flanges 43a are located more on inner sides than the weld nuts 31.

Accordingly, the vehicle body structure S1 has the mounting seats 25c made to have further increased rigidity, to suppress deformation and bending deformation of the mounting seats 25c, thereby causing the subframe 12 to come off more reliably when an excessive load is inputted.

Further, the vehicle body structure S1 of the present embodiment has the bulkheads 42 arranged so as to couple the front walls 23a, the rear walls 23b, and the mounting seats 25c with each other.

Accordingly, the vehicle body structure S1 has peripheries of the mounting seats 25c made to have further increased rigidity, to suppress deformation and bending deformation of the mounting seats 25c, thereby causing the subframe 12 to come off more reliably when an excessive load is inputted.

Note that the vehicle body structure S1 of the present embodiment has the reinforcing members 41 arranged on the upper surfaces of the mounting seats 25c, but the present disclosure is not limited thereto.

For example, the reinforcing members 41 may be arranged on lower surfaces of the mounting seats 25c. In the arrangement as described above, the front flanges 43a, the outer flanges 43d, and the rear flanges 43b extend downward. Even with this structure, the same advantageous effects as with the present embodiment are obtained.

Further, the vehicle body structure S1 of the present embodiment is employed in the engine compartment ER located in front of the occupant compartment CA, but the present disclosure is not limited thereto.

For example, the same structure may be employed in a cargo room (not shown) located behind the occupant compartment CA. Even with this structure, the same advantageous effects as with the present embodiment are obtained.

Further, the vehicle body structure S1 of the present embodiment has the weld nuts 31 arranged on the upper surfaces of the reinforcing bases 41a. When a collision load is inputted from up ahead of the vehicle, the reinforcing bases 41a around the weld nuts 31 are broken to cause the subframe 12 to come off, but the present disclosure is not limited thereto.

The weld nuts 31 may be arranged on upper surfaces of the mounting seats 25c, and through holes, through which the weld nuts 31 are inserted, may be formed in the reinforcing bases 41a, for example.

With the structure described above, when a collision load is inputted from up ahead of the vehicle, the mounting seats 25c around the weld nuts 31 are broken, to cause the subframe 12 to come off.

Even with this structure, the same advantageous effects as with the present embodiment are obtained.

Second Embodiment

Figure 7:
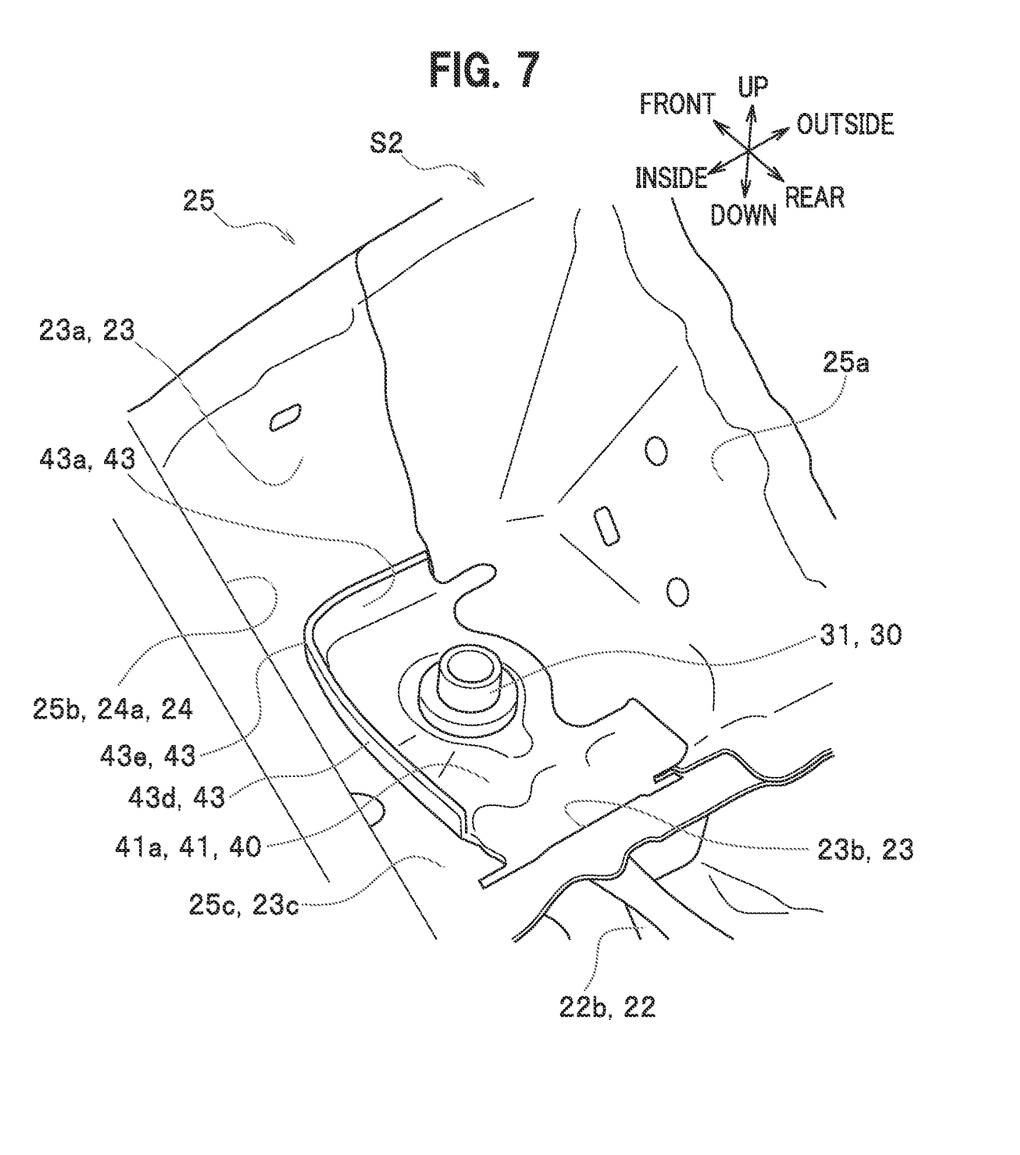
FIG. 7 is an enlarged perspective view of main parts in a portion, corresponding to the portion IV in FIG. 1, of a second embodiment.

Next, a description is given of a second embodiment of the present disclosure with reference to FIG. 7.

Note that, in the description, the same components as those in the first embodiment are denoted by the same reference signs, and duplicate descriptions thereof are omitted.

A vehicle body structure S2 of the present embodiment greatly differs from the vehicle body structure S1 of the first embodiment in that the bulkhead 42 is not included, although the reinforcing member 41 as the reinforcing device 40 is provided.

The reinforcing member 41 is formed in the same manner as in the first embodiment, to be arranged on the upper surface of the mounting seat 25c.

Even with this structure, the same advantageous effects as with the first embodiment are obtained.

What is claimed is:

1. A vehicle body structure, comprising:
   a subframe arranged in front of or behind an occupant compartment;
   a subframe rear base arranged in a width direction of a vehicle on a lower surface of a part of the occupant compartment facing the subframe;
   a floor frame arranged in a longitudinal direction of the vehicle on a lower surface of the occupant compartment;
   a subframe mount part placed at a portion where the subframe rear base overlaps with the floor frame, to support an end, closer to the occupant compartment, of the subframe;
   a mounting seat formed along a horizontal plane, to form the subframe mount part;
   a fastener to fix the subframe to the mounting seat; and
   a reinforcing member which is a plate-shaped member and is placed to overlap with the mounting seat,
   wherein the reinforcing member includes a flange, the flange including an outer flange and a front flange connected via a corner, the flange being continuous to surround a periphery of the fastener and arranged in a vertical direction of the vehicle, at a portion thereof closer to the subframe, and outer in the width direction, than the fastener.

2. The vehicle body structure as claimed in claim 1, wherein the outer flange, on an outer side in the width direction with respect to the faster, extends in the longitudinal direction to a position closer to an occupant compartment than the fastener.

3. The vehicle body structure as claimed in claim 1, wherein the front flange, on a front side in the longitudinal direction with respect to the fastener, extends in the width direction to a position more on an inner side than the fastener.

4. The vehicle body structure as claimed in claim 1, wherein the subframe mount part includes a front wall extending in the vertical direction from a front edge of the mounting seat, and a rear wall extending vertically from a rear edge of the mounting seat to face the front wall, and wherein the reinforcing member includes a bulkhead which extends in the vertical direction from a plate surface of the reinforcing member to couple the front wall with the rear wall.

* * * * *